(12) United States Patent
Yoshimi et al.

(10) Patent No.: US 8,451,537 B2
(45) Date of Patent: May 28, 2013

(54) VIDEO VIEWING FACILITY AND SELF-LUMINOUS DISPLAY

(75) Inventors: Hiroyuki Yoshimi, Ibaraki (JP); Kentarou Takeda, Ibaraki (JP); Tomohito Takita, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 401 days.

(21) Appl. No.: 12/774,145

(22) Filed: May 5, 2010

(65) Prior Publication Data

US 2010/0284075 A1 Nov. 11, 2010

(30) Foreign Application Priority Data

May 8, 2009 (JP) .................................. 2009-113192

(51) Int. Cl.
*G02B 27/28* (2006.01)

(52) U.S. Cl.
USPC .................. 359/488.01; 359/489.16; 313/112

(58) Field of Classification Search
USPC ............. 359/488.01, 489.15, 489.16; 349/98, 349/117–119; 313/112
See application file for complete search history.

(56) References Cited

U.S. PATENT DOCUMENTS

| | | | |
|---|---|---|---|
| 2005/0194896 A1* | 9/2005 | Sugita et al. ................... | 313/506 |
| 2008/0074859 A1* | 3/2008 | Kitayama et al. ............... | 362/19 |
| 2008/0143253 A1* | 6/2008 | Adachi et al. ................... | 313/504 |
| 2009/0310068 A1* | 12/2009 | Sakai ............................... | 349/96 |
| 2010/0002296 A1* | 1/2010 | Choi et al. ....................... | 359/485 |
| 2010/0265583 A1* | 10/2010 | Martin ............................. | 359/501 |
| 2011/0002037 A1* | 1/2011 | Yeh et al. ........................ | 359/465 |
| 2011/0241978 A1* | 10/2011 | Fergason ......................... | 345/88 |
| 2011/0279441 A1* | 11/2011 | Hayakawa et al. ............. | 345/212 |
| 2012/0105774 A1* | 5/2012 | Fletcher et al. ................. | 349/98 |
| 2012/0229021 A1* | 9/2012 | Sakai ............................... | 313/504 |
| 2012/0267666 A1* | 10/2012 | Hirakata et al. ................. | 257/98 |
| 2013/0027622 A1* | 1/2013 | Ishitani et al. ................... | 349/42 |

FOREIGN PATENT DOCUMENTS

| | | |
|---|---|---|
| JP | 5-225806 A | 9/1993 |
| JP | 8-271731 A | 10/1996 |
| JP | 9-127885 A | 5/1997 |
| JP | 9-133810 A | 5/1997 |
| JP | 10-333175 A | 12/1998 |

(Continued)

OTHER PUBLICATIONS

Chinese Office Action dated Jan. 31, 2012, issued in corresponding Chinese Patent Application No. 201010168466.4.

(Continued)

*Primary Examiner* — Frank Font
(74) *Attorney, Agent, or Firm* — Westerman, Hattori, Daniels & Adrian, LLP

(57) ABSTRACT

A video viewing facility is provided. A circularly polarized light source is provided outside a self-luminous display. The self-luminous display includes a first wave plate having a function of converting circularly polarized light into linearly polarized light; a polarizing film; a second wave plate having a function of converting circularly polarized light into linearly polarized light; a circularly polarized light separating film; and a self-luminous panel, in this order from a visible side of the self-luminous display.

5 Claims, 7 Drawing Sheets

FOREIGN PATENT DOCUMENTS

| | | |
|---|---|---|
| JP | 2001-154180 A | 6/2001 |
| JP | 2001-357979 A | 12/2001 |
| JP | 2004-30955 A | 1/2004 |
| JP | 2004-70094 A | 3/2004 |
| JP | 2004-107542 A | 4/2004 |
| JP | 2004-361774 A | 12/2004 |
| JP | 2005-97240 A | 4/2005 |
| JP | 2008-3536 A | 1/2008 |

OTHER PUBLICATIONS

Chinese Office Action dated Nov. 2, 2012, issued in corresponding Chinese Patent Application No. 201010168466.4, (13 pages). With English Translation.

Japanese Office Action dated Dec. 28, 2012, issued in corresponding Japanese patent application No. 2009-113192, w/ English translation.

* cited by examiner

VIDEO VIEWING FACILITY AND SELF-LUMINOUS DISPLAY

The disclosure of Japanese Patent Application No. 2009-113192 filed on May 8, 2009 including specification, drawings and claims is incorporated herein by reference in its entirety.

BACKGROUND

This invention relates to a video viewing facility for viewing video of a self-luminous display.

A self-luminous display such as an organic EL display or a plasma display is a device for displaying video by emitting light by a panel itself. However, the self-luminous display has a problem in that external light (light incident on the panel from the outside) is easily reflected.

To prevent such reflection of external light, Japanese Patent Publication No. 9-127885 A discloses a self-luminous display including a polarizing film 50, a λ/4 plate 60, and a self-luminous panel 80 in this order from the visible side as shown in FIG. 7. In this self-luminous display, of external light k1, linearly polarized light vibrating in an absorption axis direction A of the polarizing film 50 (about a half of the external light k1) is absorbed in the polarizing film 50 and linearly polarized light k2 vibrating in the direction orthogonal to the absorption axis direction A (remaining half of the external light k1) passes through the polarizing film 50. The linearly polarized light k2 passed through the polarizing film 50 is converted into clockwise circularly polarized light k3 (or counterclockwise circularly polarized light) by the λ/4 plate 60. The clockwise circularly polarized light k3 (or counterclockwise circularly polarized light) is reflected on the surface of the self-luminous panel 80 and changes to counterclockwise circularly polarized light k4 (or clockwise circularly polarized light). This counterclockwise circularly polarized light k4 (or clockwise circularly polarized light) is converted into linearly polarized light k5 vibrating in the absorption axis direction A by the λ/4 plate 60 and this linearly polarized light k5 is absorbed in the polarizing film 50. In this way, the related-art self-luminous display prevents the reflection of the external light.

However, in the related-art self-luminous display has a problem in that the polarizing film absorbs about a half of display light emitted from the self-luminous panel and thus the screen becomes dark.

Specifically, display light m1 emitted from the self-luminous panel 80 passes through the λ/4 plate 60 and is incident on the polarizing film 50 as shown in FIG. 7. The polarizing film 50 transmits only one of the orthogonal polarized light components therethrough and absorbs the other of the orthogonal polarized light components. That is, as shown in FIG. 7, when natural light is represented as it is separated into two orthogonal components (linearly polarized light m2 and linearly polarized light m3), the linearly polarized light m3 vibrating in the transmission axis direction of the polarizing film 50 passes through the polarizing film 50. However, the linearly polarized light m2 vibrating in the absorption axis direction A is absorbed in the polarizing film 50 and thus is not seen by the viewer. Therefore, the screen of the related-art self-luminous display becomes dark. Further, since the external light reflection prevention effect of the related-art self-luminous display is not sufficient, it is necessary to darken a room to view high-quality video.

SUMMARY

It is therefore an object of at least one embodiment of the present invention to provide a video viewing facility that can prevent reflection of external light and enables the user to view high-quality video.

According to a first aspect of at least one embodiment of the present invention, there is provided a video viewing facility comprising: a self-luminous display; and a circularly polarized light source provided outside the self-luminous display, wherein the self-luminous display includes: a first wave plate having a function of converting circularly polarized light into linearly polarized light; a polarizing film; a second wave plate having a function of converting circularly polarized light into linearly polarized light; a circularly polarized light separating film; and a self-luminous panel, in this order from a visible side of the self-luminous display.

Each of the first and second wave plates may be comprised of a λ/4 plate, the first wave plate may be arranged such that circularly polarized light emitted from the circularly polarized light source is converted into linearly polarized light by the first wave plate and then the linearly polarized light is absorbed in the polarizing film, and the second wave plate may be arranged such that circularly polarized light passed through the circularly polarized light separating film is converted into linearly polarized light by the second wave plate and then the linearly polarized light passes through the polarizing film.

The first wave plate may be arranged such that a slow axis of the first wave plate is inclined with respect to an absorption axis of the polarizing film at an angle of 45±5 degrees or an angle of 135±5 degrees, and the second wave plate may be arranged such that a slow axis of the second wave plate is inclined with respect to the absorption axis of the polarizing film at an angle of 45±5 degrees or an angle of 135±5 degrees.

According to a second aspect of at least one embodiment of the present invention, there is provided a self-luminous display, comprising: a first wave plate having a function of converting circularly polarized light into linearly polarized light; a polarizing film; a second wave plate having a function of converting circularly polarized light into linearly polarized light; a circularly polarized light separating film; and a self-luminous panel, in this order from a visible side of the self-luminous display.

The self-luminous display according to aspects of at least one embodiment of the present invention has excellent black luminance because the external light is hard to reflect on the screen. Further, the self-luminous display has excellent white luminance because the display light of the self-luminous panel is almost emitted from the screen to the outside. Therefore, the video viewing facility having the self-luminous display would enable the viewer to view the high-quality video.

DETAILED DESCRIPTION OF THE EMBODIMENTS

The present invention will be specifically discussed below with reference to the accompanying drawings.

Figure 1:
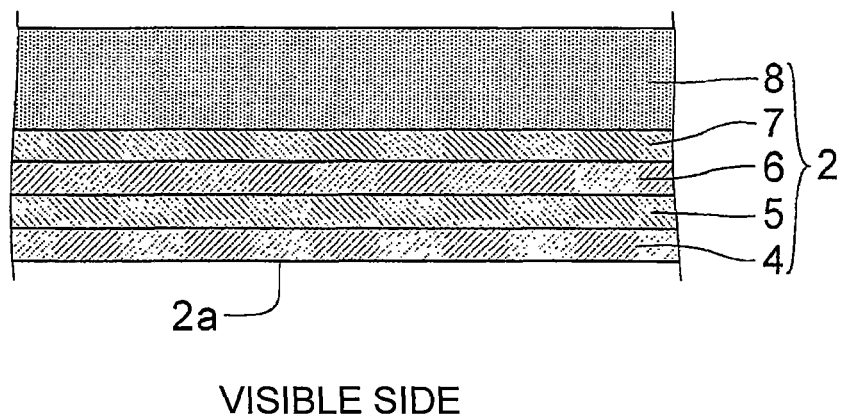
FIG. 1 is a configuration view illustrating a video viewing facility according to an embodiment of the present invention, including a cross-sectional view of a self-luminous display.
Figure 1:
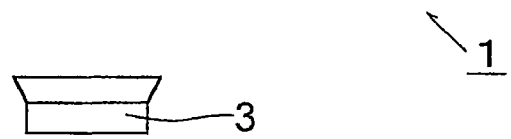

FIG. 1 illustrates a video viewing facility according to an embodiment of the present invention. The fragmentary cross-sectional view in FIG. 1 illustrates a layer configuration of a self-luminous display.

In FIG. 1, a video viewing facility 1 of the embodiment has a self-luminous display 2 and a circularly polarized light source 3 provided outside the self-luminous display 2. The circularly polarized light source 3 is provided such that circularly polarized light emitted therefrom illuminates a screen (visible face 2a) of the self-luminous display 2.

(Circularly Polarized Light Source)

The circularly polarized light source is a light source for emitting circularly polarized light. The circularly polarized light source in one embodiment is a light source for emitting both clockwise circularly polarized light and counterclockwise circularly polarized light, and the intensity of one of the clockwise circularly polarized light and the counterclockwise circularly polarized light is large (in this case, when the intensity of the clockwise circularly polarized light is large, the circularly polarized light source is a light source for emitting the clockwise circularly polarized light). The circularly polarized light source in various embodiments is a light source for emitting substantially counterclockwise circularly polarized light only or substantially clockwise circularly polarized light only.

The circularly polarized light source includes a light source for emitting circularly polarized light by itself or a light source having a function of changing light passed therethrough to circularly polarized light although the light source itself does not emit light.

In this specification, "clockwise circularly polarized light" means polarized light in which a trajectory of an electric field vector rotates clockwise when seen from the traveling direction of light and "counterclockwise circularly polarized light" means polarized light in which a trajectory rotating of an electric field vector rotates counterclockwise when seen from the traveling direction of light. Hereinafter, clockwise circularly polarized light will be described as "right circularly polarized light" and counterclockwise circularly polarized light will be described as "left circularly polarized light" and right circularly polarized light and/or left circularly polarized light will be described simply as "circularly polarized light."

As the circularly polarized light source, for example, illumination using a circularly polarized light dichromatic light emission material, illumination in which a circularly polarized light separating film is provided in a light source for emitting natural light, can be used. As the circularly polarized light dichromatic light emission material, for example, a liquid crystalline conjugated polymer compound having a spiral structure disclosed in Japanese Patent Publication No. 2004-107542A, a rare earth complex disclosed in Japanese Patent Publication No. 2005-97240A, can be used. As the light source for emitting natural light, for example, a general light source of a fluorescent lamp, an incandescent lamp, can be used. The circularly polarized light separating film provided in the light source for emitting the natural light is a separate film from a circularly polarized light separating film provided in the self-luminous display according to the embodiment. As the circularly polarized light separating film provided in the light source for emitting the natural light, for example, a film similar to the circularly polarized light separating film provided in the self-luminous display can be used as described later.

A light source using natural light of sunlight, etc., can also be used as the circularly polarized light source. For example, if the self-luminous display of the embodiment is installed in a room of a structure (for example, in a room of a building; in a room of a vehicle such as a car, a train, an airplane, etc.), a circularly polarized light separating film may be provided on a window on which sunlight is incident in the room of the structure. When the circularly polarized light separating film is provided on the window on which natural light can be incident, the screen of the self-luminous display installed in the room of the structure is illuminated by circularly polarized light.

The "natural light" means light whose electric field vector is distributed in an arbitrary direction.

(Self-Luminous Display)

In FIG. 1, the self-luminous display 2 includes a first wave plate 4 having a function of converting circularly polarized light into linearly polarized light, a polarizing film 5, a second wave plate 6 having a function of converting circularly polarized light into linearly polarized light, a circularly polarized light separating film 7, and a self-luminous panel 8, in this order from a visible side of the self-luminous display 2. Each film such as the first wave plate 4, usually is laminated and bonded with an adhesive, etc.

In this specification, the "visible side" means a side at which the viewer can view the video displayed on the display.

The self-luminous display 2 of the embodiment may be provided with any other optical film or member within the scope not impairing the advantages of the present invention.

(First Wave Plate and Second Wave Plate)

The first wave plate and the second wave plate of the embodiment are films having a function of converting right circularly polarized light or left circularly polarized light into linearly polarized light and a function of converting linearly polarized light into right circularly polarized light or left circularly polarized light.

Each of the first wave plate and the second wave plate may be comprised of a film of a single layer or may be comprised of a film of two layers or more. The first wave plate and the second wave plate may be the same films or may be different films.

Preferably, λ/4 plate can be used as the first wave plate and the second wave plate. By appropriately setting an angle of its slow axis direction, each of the first wave plate and the second wave plate comprised of the λ/4 plate is provided with the function of converting right circularly polarized light or left circularly polarized light into linearly polarized light and the function of converting linearly polarized light into right circularly polarized light or left circularly polarized light.

In this specification, the "slow axis direction" refers to a direction in which the refraction index becomes the maximum in the plane of the wave plate.

The λ/4 plate refers to a film where the in-plane retardation value is a quarter in at least one wavelength of a visible light range. The in-plane retardation value of this λ/4 plate preferably is 120 nm to 160 nm at a temperature of 23° C. and a wavelength of 590 nm.

The in-plane retardation value is calculated by $Re[\lambda]=(nx-ny)\times d$. $Re[\lambda]$ represents the in-plane retardation value at a temperature of 23° C. and a wavelength of λ nm, nx represents the refraction index in the slow axis direction in the plane of the λ/4 plate, ny represents the refraction index in the direction orthogonal to the slow axis direction in the plane of the λ/4 plate, and d represents the thickness (nm) of the λ/4 plate.

The λ/4 plate is not limited; for example, a drawn polymeric film, a film containing a liquid crystalline compound, etc., can be used as the λ/4 plate.

(Polarizing Film)

The polarizing film of the embodiment is an absorption-type polarizing film. The absorption-type polarizing film is a polarizing film having a function of transmitting one polarized light therethrough and absorbing the other polarized light component when incident light is separated into two components of polarized light. Therefore, the absorption-type polarizing film almost transmits linearly polarized light in which its vibration direction of an electric field vector exists in a specific plane, and almost absorbs linearly polarized light which is orthogonal to the above-mentioned linearly polarized light in the vibration direction.

The polarizing film is not limited; for example, a polyvinyl alcohol based film dyed in a dichromatic pigment, an oriented film with a dichromatic pigment oriented, etc., can be used as the polarizing film.

The polarizing film may be used solely or may be used in the form of a laminated body with a transparent protective film laminated on both sides or one side of the polarizing film (the laminated body generally is called polarizing plate).

In this specification, the transmission axis direction of the polarizing film refers to a direction in which the transmittance becomes the maximum when linearly polarized light is incident on the polarizing film face from the perpendicular direction, and the absorption axis direction of the polarizing film refers to a direction in which the transmittance becomes the minimum when linearly polarized light is incident on the polarizing film face from the perpendicular direction.

(Circularly Polarized Light Separating Film)

The circularly polarized light separating film of the invention is a film having a function of separating natural light into right circularly polarized light and left circularly polarized light and reflecting one of the right circularly polarized light and the left circularly polarized light preferentially and transmitting the other circularly polarized light therethrough preferentially.

For example, the circularly polarized light separating film reflects right circularly polarized light (or left circularly polarized light) from natural light and transmits left circularly polarized light (or right circularly polarized light) from natural light therethrough.

The circularly polarized light separating film is not limited; for example, each of cholesteric liquid crystalline layers disclosed in Japanese Patent Publication No. 8-271731A and Japanese Patent Publication No. 9-133810A can be used as the circularly polarized light separating film. If the spiral orientation direction of liquid crystal molecules of the cholesteric liquid crystalline layer is clockwise, this layer transmits left circularly polarized light therethrough and reflects right circularly polarized light. On the other hand, if the spiral orientation direction of liquid crystal molecules is counterclockwise, the layer transmits right circularly polarized light therethrough and reflects left circularly polarized light.

Which of the circularly polarized light separating film for transmitting right circularly polarized light therethrough and the circularly polarized light separating film for transmitting left circularly polarized light therethrough is to be used is determined as required in response to the types of the circularly polarized light source, the first wave plate, and the second wave plate.

(Self-Luminous Panel)

The self-luminous panel built in the self-luminous display of the embodiment is a panel for emitting light by itself.

The self-luminous panel is not limited; representatively, a panel of organic EL (electroluminescence), plasma, a cathode ray tube, field emission, etc., can be used as the self-luminous panel.

(Placements of Members)

In the self-luminous display of the embodiment, the first wave plate is arranged such that circularly polarized light emitted from the circularly polarized light source is converted into linearly polarized light by the first wave plate and then the linearly polarized light is absorbed in the polarizing film. On the other hand, the second wave plate is arranged such that circularly polarized light emitted from the self-luminous panel and passed through the circularly polarized light separating film is converted into linearly polarized light by the second wave plate and then the linearly polarized light passes through the polarizing film.

Figure 2:
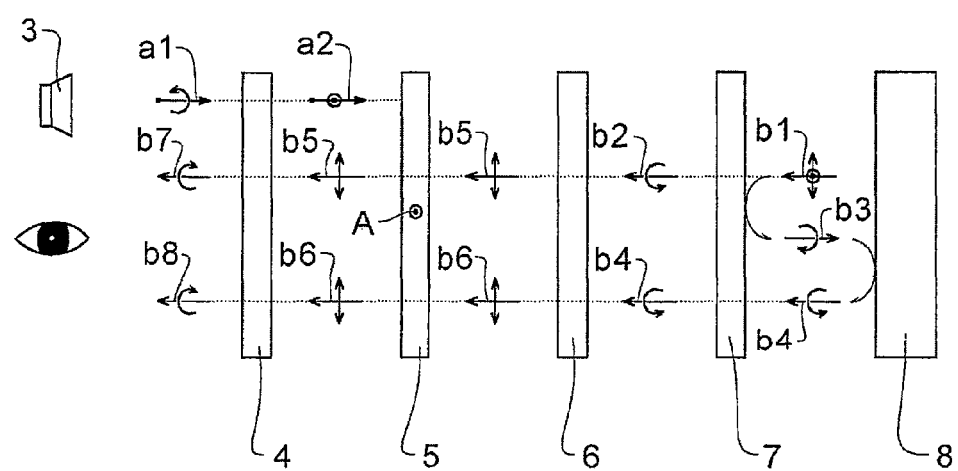
FIG. 2 is a reference view conceptually illustrating absorption of external light and transmission of display light in the video viewing facility according to the embodiment.

In the self-luminous display thus arranged, circularly polarized light a1 (external light) emitted from the circularly polarized light source 3 is converted into linearly polarized light a2 having a vibration direction parallel with the absorption axis direction A of the polarizing film 5 by the first wave plate 4, as shown in FIG. 2. The linearly polarized light a2 parallel with the absorption axis direction A is almost absorbed in the polarizing film 5. Thus, it is possible to prevent the circularly polarized light a1 emitted from the circularly polarized light source for illuminating the screen of the self-luminous display from being reflected on the screen of the self-luminous display. Thus, in the video viewing facility of the embodiment, black luminance of the self-luminous display becomes low.

On the other hand, display light b1 (natural light) emitted from the self-luminous panel 8 is separated into left circularly polarized light b2 and right circularly polarized light b3 by the circularly polarized light separating film 7. One circularly polarized light b2 (for example, left circularly polarized light) passes through the circularly polarized light separating film 7 and the other circularly polarized light b3 (for example, right circularly polarized light) is reflected by the circularly polarized light separating film 7. The reflected other circularly polarized light b3 is reflected on the surface of the self-luminous panel 8 and becomes left-right inverted circularly polarized light b4 (for example, left circularly polarized light) and again proceeds toward the circularly polarized light separating film 7. The left-right inverted circularly polarized light b4 (for example, left circularly polarized light) passes through the circularly polarized light separating film 7. Therefore, almost all of the display light b1 emitted from the self-luminous panel 8 changes to circularly polarized light b2, b4 in the same rotation direction (for example, left circularly polarized light) by the above action of the circularly polarized light separating film 7 and proceeds to the second wave plate 6. The circularly polarized light b2, b4 is converted into linearly polarized light b5, b6 having a vibration direction parallel with the transmission axis direction of the polarizing film 5 by the second wave plate 6 (in other words, converted into linearly polarized light b5, b6 having a vibration direction orthogonal to the absorption axis direction A of the polarizing film 5). The linearly polarized light b5, b6 parallel with the transmission axis direction almost passes through the polarizing film 5. The linearly polarized light b5, b6 passed through the polarizing film 5 is converted into circularly polarized light b7, b8 by the first wave plate 4 and then is emitted from the screen of the self-luminous display to the outside. Thus, the viewer can view almost all of the display light b1 emitted from the self-luminous display. Therefore, the video viewing facility of the embodiment enables the viewer to view a bright and clear video with high white luminance of the self-luminous display.

According to the principle as described above, the video viewing facility of the embodiment scarcely reflects the external light and is excellent in the contrast ratio and thus it is possible to allow the viewer to view high-quality video without darkening the peripheral environment of the self-luminous display.

In the video viewing facility of the embodiment, the following four configuration examples are possible as specific arrangement examples when a λ/4 plate is used as each of the first wave plate and the second wave plate:

A first configuration example is effective when circularly polarized light from the circularly polarized light source is left circularly polarized light. The self-luminous display includes the first wave plate 4, the polarizing film 5, the second wave plate 6, the circularly polarized light separating film 7, and the self-luminous panel 8 which are arranged in this order from the visible side of the self-luminous display (the same arrangement also applies to second to fourth embodiments described later).

Figure 3:
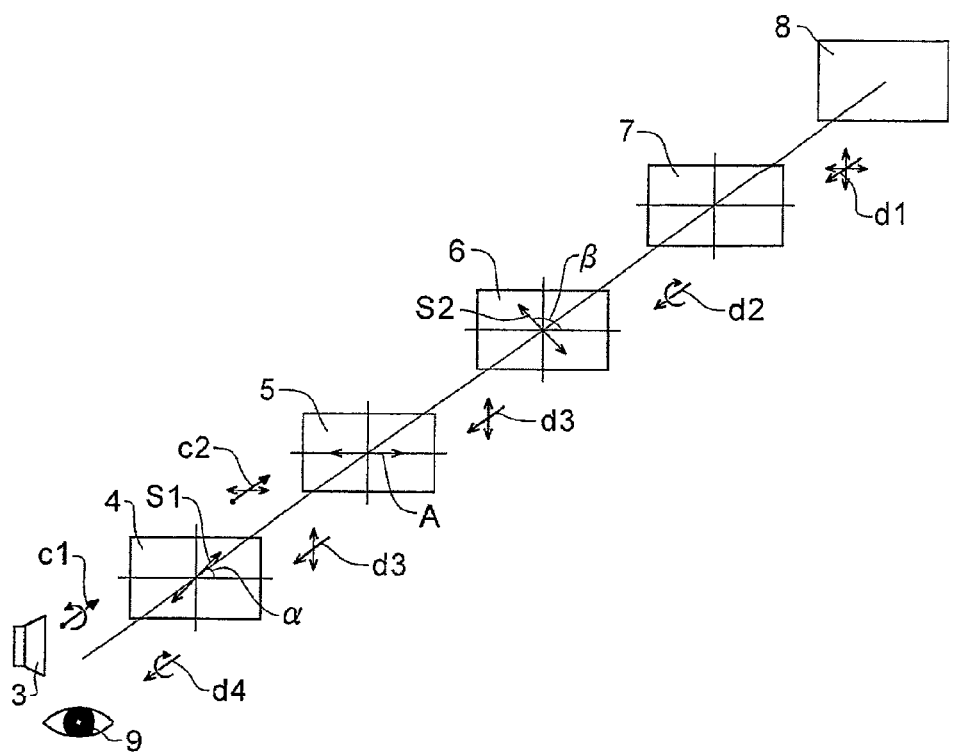
FIG. 3 is a reference perspective view conceptually illustrating a first configuration example of the self-luminous display according to the embodiment and absorption of external light and transmission of display light in the first configuration example.

In the first configuration example, as shown in FIG. 3, the first wave plate 4 is arranged such that angle α between slow axis direction S1 of the first wave plate 4 and the absorption axis direction A of the polarizing film 5 becomes 45±5 degrees counterclockwise viewed from the visible side, and the second wave plate 6 is arranged such that angle β between slow axis direction S2 of the second wave plate 6 and the absorption axis direction A of the polarizing film 5 becomes 135±5 degrees counterclockwise viewed from the visible side. Hereinafter, "angle α between the slow axis direction S1 of the first wave plate 4 and the absorption axis direction A of the polarizing film 5" will be described simply as "angle α" and "angle β between the slow axis direction S2 of the second wave plate 6 and the absorption axis direction A of the polarizing film 5" will be described simply as "angle β."

As the circularly polarized light separating film 7, for example, a circularly polarized light separating film having a function of transmitting right circularly polarized light therethrough and reflecting left circularly polarized light, of natural light d1 from the self-luminous panel 8 side (non-visible side) can be used.

In the first configuration example, left circularly polarized light c1 emitted from the circularly polarized light source 3 is converted into linearly polarized light c2 in the absorption axis direction A by the first wave plate 4 and then the light is almost absorbed in the polarizing film 5.

On the other hand, most of display light d1 (natural light) emitted from the self-luminous panel 8 is changed to right circularly polarized light d2 by the circularly polarized light separating film 7 and the light passes through the circularly polarized light separating film 7 according to the principle described with reference to FIG. 2. This right circularly polarized light d2 (namely, display light emitted from the self-luminous panel 8) is converted into linearly polarized light d3 in the transmission axis direction by the second wave plate 6, the light passes through the polarizing film 5, the light is converted into right circularly polarized light d4 by the first wave plate 4 and then the light is viewed by the viewer (eye 9).

A second configuration example is also effective when circularly polarized light from the circularly polarized light source is left circularly polarized light.

Figure 4:
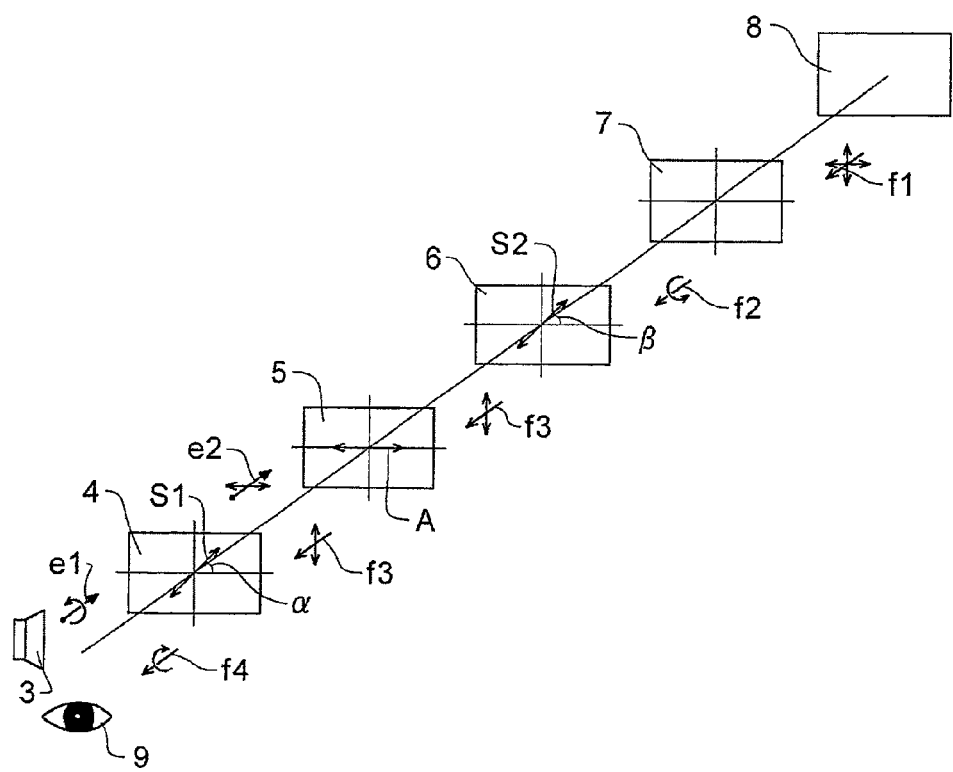
FIG. 4 is a reference perspective view conceptually illustrating a second configuration example and absorption of external light and transmission of display light in the second configuration example.

In the second configuration example, as shown in FIG. 4, the first wave plate 4 is arranged such that the angle α becomes 45±5 degrees counterclockwise viewed from the visible side, and the second wave plate 6 is arranged such that the angle β becomes 45±5 degrees counterclockwise viewed from the visible side.

As the circularly polarized light separating film 7, for example, a circularly polarized light separating film having a function of transmitting left circularly polarized light therethrough and reflecting right circularly polarized light, of natural light f1 emitted from the self-luminous panel 8 side (non-visible side) can be used.

In the second configuration example, left circularly polarized light e1 emitted from the circularly polarized light source 3 is converted into linearly polarized light e2 in the absorption axis direction A by the first wave plate 4 and then the light is almost absorbed in the polarizing film 5.

On the other hand, most of display light f1 emitted from the self-luminous panel 8 is changed to left circularly polarized light f2 by the circularly polarized light separating film 7 and the light passes through the circularly polarized light separating film 7 according to the principle described with reference to FIG. 2. This left circularly polarized light f2 is converted into linearly polarized light f3 in the transmission axis direction by the second wave plate 6, the light passes through the polarizing film 5, the light is converted into left circularly polarized light f4 by the first wave plate 4 and then the light is viewed by the viewer (eye 9).

A third configuration example is effective when circularly polarized light from the circularly polarized light source is right circularly polarized light.

Figure 5:
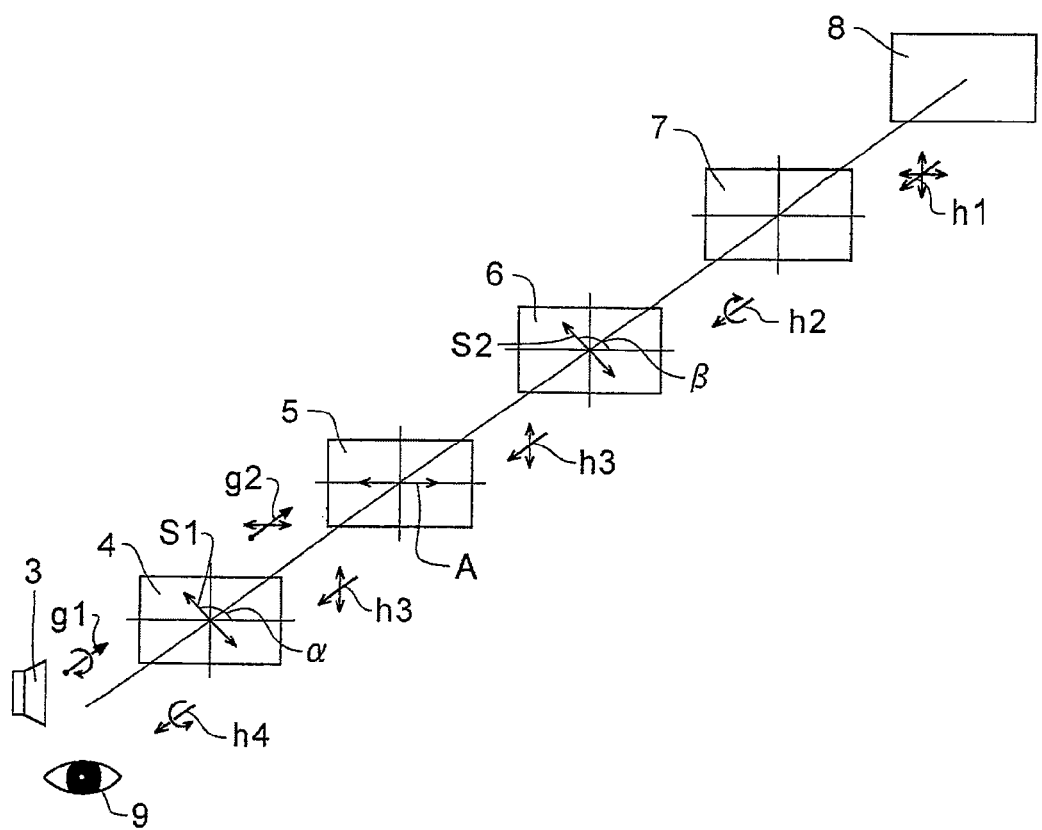
FIG. 5 is a reference perspective view conceptually illustrating a third configuration example and absorption of external light and transmission of display light in the third configuration example.

In the third configuration example, as shown in FIG. 5, the first wave plate 4 is arranged such that the angle α becomes 135±5 degrees counterclockwise viewed from the visible side, and the second wave plate 6 is arranged such that the angle β becomes 135±5 degrees counterclockwise viewed from the visible side.

As the circularly polarized light separating film 7, for example, a circularly polarized light separating film having a function of transmitting right circularly polarized light therethrough and reflecting left circularly polarized light, of natural light h1 emitted from the self-luminous panel 8 side (non-visible side) can be used.

In the third configuration example, right circularly polarized light g1 emitted from the circularly polarized light source 3 is converted into linearly polarized light g2 in the absorption axis direction A by the first wave plate 4 and then the light is almost absorbed in the polarizing film 5.

On the other hand, most of display light h1 emitted from the self-luminous panel 8 is changed to right circularly polarized light h2 by the circularly polarized light separating film 7 and the light passes through the circularly polarized light separating film 7 according to the principle described with reference to FIG. 2. This right circularly polarized light h2 is converted into linearly polarized light h3 in the transmission axis direction by the second wave plate 6, the light passes through the polarizing film 5, the light is converted into left circularly polarized light h4 by the first wave plate 4 and then the light is viewed by the viewer (eye 9).

A fourth configuration example is effective when circularly polarized light from the circularly polarized light source is right circularly polarized light.

Figure 6:
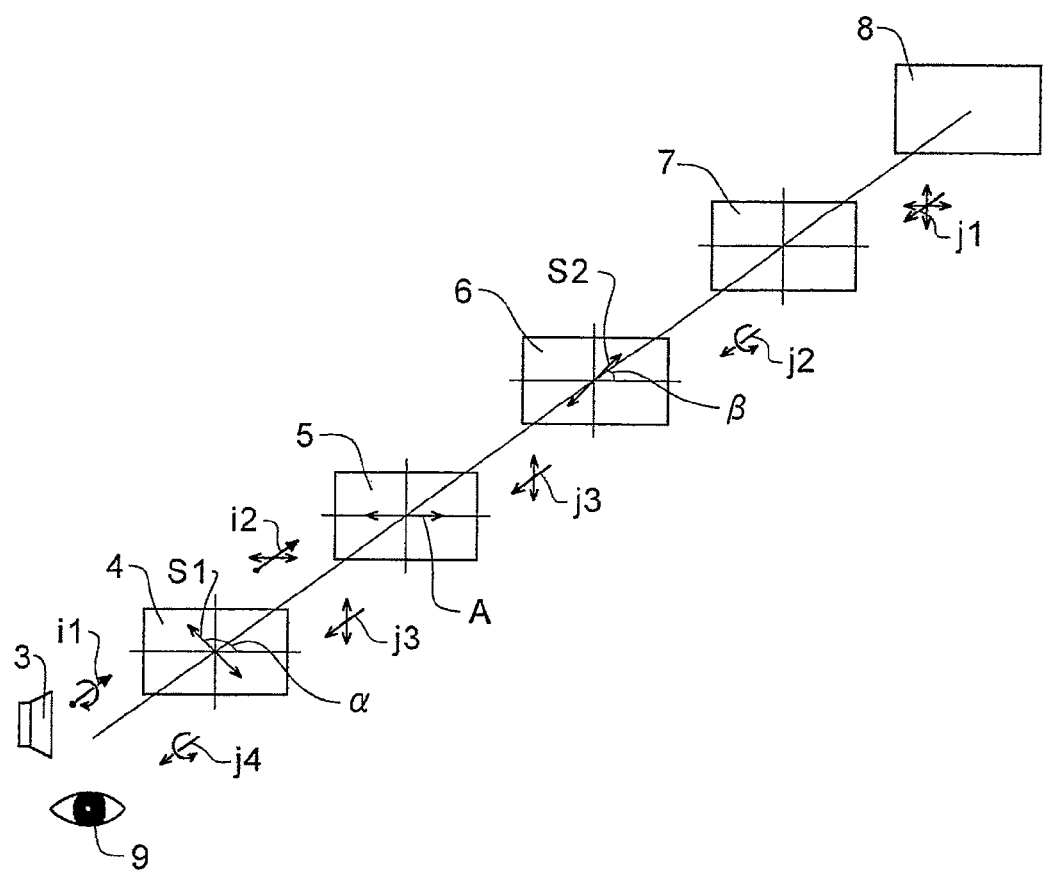
FIG. 6 is a reference perspective view conceptually illustrating a fourth configuration example and absorption of external light and transmission of display light in the fourth configuration example.
Figure 7:
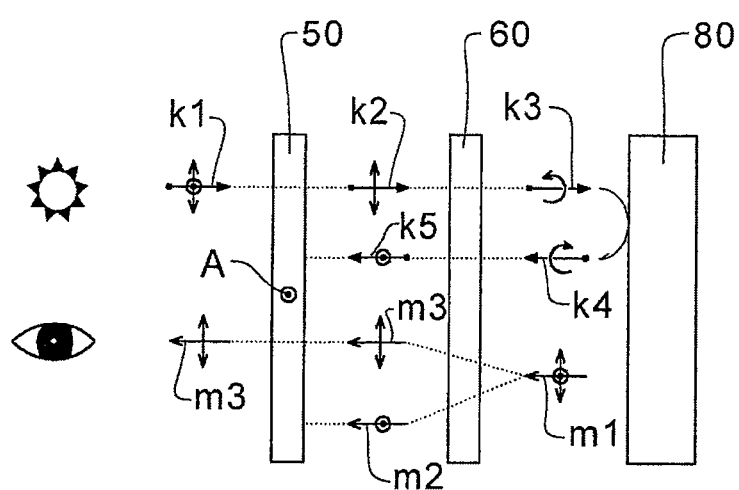
FIG. 7 is a reference view conceptually illustrating absorption of external light and transmission of display light in a related-art self-luminous display.

In the fourth configuration example, as shown in FIG. 6, the first wave plate 4 is arranged such that the angle α becomes 135±5 degrees counterclockwise viewed from the visible side, and the second wave plate 6 is arranged such that the angle β becomes 45±5 degrees counterclockwise viewed from the visible side.

As the circularly polarized light separating film 7, for example, a circularly polarized light separating film having a function of transmitting left circularly polarized light therethrough and reflecting right circularly polarized light, of natural light j1 emitted from the self-luminous panel 8 side (non-visible side) can be used.

In the fourth configuration example, right circularly polarized light i1 emitted from the circularly polarized light source 3 is converted into linearly polarized light j2 in the absorption axis direction A by the first wave plate 4 and then the light is almost absorbed in the polarizing film 5.

On the other hand, most of display light j1 emitted from the self-luminous panel 8 is changed to left circularly polarized light j2 by the circularly polarized light separating film 7 and the light passes through the circularly polarized light separating film 7 according to the principle described with reference to FIG. 2. This left circularly polarized light j2 is converted into linearly polarized light j3 in the transmission axis direction by the second wave plate 6, the light passes through the polarizing film 5, the light is converted into left circularly polarized light j4 by the first wave plate 4 and then the light is viewed by the viewer (eye 9).

Considering all of the first to fourth configuration examples in the embodiment, the first wave plate 4 is arranged such that the slow axis of the first wave plate 4 is inclined with respect to the absorption axis of the polarizing film 5 at an angle of 45±5 degrees or an angle of 135±5 degrees, and the second wave plate 6 is arranged such that the slow axis of the second wave plate 6 is inclined with respect to the absorption axis of the polarizing film 5 at an angle of 45±5 degrees or an angle of 135±5 degrees.

Hereinafter, the present invention will be discussed in detail showing Example and Comparison Examples. The invention is not limited to the following Example. Measurement methods used in Example and Comparison Examples are as follows:

[Measurement Method of in-Plane Retardation Value]

The in-plane retardation value of λ/4 plate was measured at a temperature of 23° C. using a retardation measuring apparatus (manufactured by Oji Scientific Instruments, product name "KOBRA21ADH").

[Measurement Method of Black Luminance and White Luminance]

Black luminance and white luminance when a black image and a white image were displayed on self-luminous display were measured at a measurement distance of 1 m and a measurement visual field of 1 degree using a luminance meter (manufactured by Topcon Corporation, product name "BM-5").

EXAMPLE

A λ/4 plate as a first wave plate (manufactured by Nitto Denko Corporation, trade name "NZF," and in-plane retardation value at a wavelength of 590 nm=140 nm), a polarizing plate (manufactured by Nitto Denko Corporation, trade name "NPFSEG1224DU"), a λ/4 plate as a second wave plate, and a circularly polarized light separating film comprised of a cholesteric liquid crystalline layer were laminated on the surface of an organic EL panel of a mobile phone (manufactured by Kyocera Corporation, trade name "W52K") on which an organic EL display is installed, in this order from the visible side, thereby manufacturing a self-luminous display. Both the λ/4 plates and the polarizing plate were arranged at the same axis angle as shown in FIG. 3.

As each of the λ/4 plate as the second wave plate and the circularly polarized light separating film, a preliminary laminated film (manufactured by Nitto Denko Corporation, trade name "PCF400") was used. The in-plane retardation value at a wavelength of 590 nm of this λ/4 plate (the second wave plate) was 140 nm. The circularly polarized light separating film transmits right circularly polarized light of natural light emitted from the organic EL panel therethrough and reflects left circularly polarized light of the natural light.

A circularly polarized light source was placed at a position separated at a distance of about 60 cm from the screen (visible face) of the obtained self-luminous display to the visible side, thereby forming a video viewing facility of the Example.

As the circularly polarized light source, a circularly polarized light separating film (a circularly polarized light separating film provided by removing a λ/4 plate from a circularly polarized light separating film (manufactured by Nitto Denko Corporation, trade name "PCF400") was put on a fluorescent lamp portion of a desk stand light fitting (manufactured by Panasonic Corporation, trade name "LOVE EYE INVERTER") including a fluorescent lamp.

A black image and a white image were displayed on the self-luminous display of the Example in a state where the circularly polarized light source (the fluorescent lamp on which the circularly polarized light separating film is put) was turned on, and the luminance of each of the images was measured. Table 1 shows the result of the measurements. The contrast ratio in Table 1 is calculated by white luminance/black luminance.

Comparison Example 1

A polarizing plate (manufactured by Nitto Denko Corporation, trade name "NPFSEG1224DU") and a λ/4 plate (manufactured by Nitto Denko Corporation, trade name "NZF," and in-plane retardation value at a wavelength of 590 nm=140 nm) were laminated on the surface of an organic EL panel of a mobile phone (manufactured by Kyocera Corporation, trade name "W52K") on which an organic EL display is installed, in this order from the visible side, thereby manufacturing a self-luminous display. The λ/4 plate and the polarizing plate were laminated such that the angle between the slow axis direction of the λ/4 plate and the absorption axis direction of the polarizing plate becomes 45 degrees counterclockwise viewed from the visible side.

A natural light source was placed at a position separated at a distance of about 60 cm from the screen of the obtained self-luminous display to the visible side, thereby forming a video viewing facility of Comparison Example 1. As the natural light source, the fluorescent lamp of a desk stand light fitting (manufactured by Panasonic Corporation, trade name "LOVE EYE INVERTER") including the fluorescent lamp was used.

A black image and a white image were displayed on the self-luminous display of Comparison Example 1 in a state where the natural light source (the fluorescent lamp) was turned on, and the luminance of each of the images was measured. Table 1 shows the result of the measurements.

Comparison Example 2

A video viewing facility was formed as in Comparison Example 1 except that the polarizing plate and the λ/4 plate were removed from the self-luminous display of Comparison Example 1 (namely, except that nothing is laminated on the organic EL display installed on the mobile phone and this organic EL display is used as a self-luminous display).

About the video viewing facility of Comparison Example 2, each luminance was measured as well as Comparison Example 1. Table 1 shows the result of the measurement.

TABLE 1

| | Black luminance (cd/m$^2$) | White luminance (cd/m$^2$) | Contrast ratio |
|---|---|---|---|
| Example | 2.0 | 301.5 | 150.8 |
| Comparison Example 1 | 2.3 | 157.5 | 68.5 |
| Comparison Example 2 | 5.8 | 351.2 | 60.6 |

[Evaluation]

The video viewing facility of the Example has low black luminance and high white luminance and is also excellent in the contrast ratio in response to them and thus it was acknowledged that a high-quality image can be displayed.

On the other hand, the video viewing facility of Comparison Example 1 has low white luminance and thus it is seen that an image is dark. The video viewing facility of Comparison Example 2 has high black luminance and thus it is seen that external light is reflected.

The video viewing facility of the invention can be used for viewing TV video and a movie in a building such as a home, a cinema, and a commodity exhibition hall, etc., and in a vehicle such as a car and an airplane, etc.

What is claimed is:

1. A video viewing facility comprising:
   a self-luminous display; and
   a circularly polarized light source provided outside the self-luminous display,
   wherein the self-luminous display includes in order from the circularly polarized light source:
      a first wave plate having a function of converting circularly polarized light into linearly polarized light;
      a polarizing film;
      a second wave plate having a function of converting circularly polarized light into linearly polarized light;
      a circularly polarized light separating film having a function of separating a display light emitted from a self-luminous panel into right circularly polarized light and left circularly polarized light, reflecting one of the right circularly polarized light and the left circularly polarized light and transmitting the other of the right circularly polarized light and the left circularly polarized light therethrough; and
      the self-luminous panel,
   wherein the first wave plate is arranged such that circularly polarized light emitted from the circularly polarized light source is converted into linearly polarized light by the first wave plate and then the linearly polarized light is absorbed in the polarizing film, and
   wherein the second wave plate is arranged such that circularly polarized light passed through the circularly polarized light separating film is converted into linearly polarized light by the second wave plate and then the linearly polarized light passes through the polarizing film.

2. The video viewing facility as set forth in claim 1, wherein each of the first and second wave plates is comprised of a λ/4 plate.

3. The video viewing facility as set forth in claim 1,
   wherein the first wave plate is arranged such that a slow axis of the first wave plate is inclined with respect to an absorption axis of the polarizing film at an angle of 45±5 degrees or an angle of 135±5 degrees, and
   wherein the second wave plate is arranged such that a slow axis of the second wave plate is inclined with respect to the absorption axis of the polarizing film at an angle of 45±5 degrees or an angle of 135±5 degrees.

4. A self-luminous display, comprising:
   a first wave plate having a function of converting circularly polarized light into linearly polarized light;
   a polarizing film;
   a second wave plate having a function of converting circularly polarized light into linearly polarized light;
   a circularly polarized light separating film having a function of separating a display light emitted from a self-luminous panel into right circularly polarized light and left circularly polarized light, reflecting one of the right circularly polarized light and the left circularly polarized light and transmitting the other of the right circularly polarized light and the left circularly polarized light therethrough; and
   the self-luminous panel, in this order from a visible side of the self-luminous display,
   wherein the first wave plate is arranged such that circularly polarized light emitted from a circularly polarized light source which is provided outside the self-luminous display is converted into linearly polarized light by the first wave plate and then the linearly polarized light is absorbed in the polarizing film, and
   wherein the second wave plate is arranged such that circularly polarized light passed through the circularly polarized light separating film is converted into linearly polarized light by the second wave plate and then the linearly polarized light passes through the polarizing film.

5. The self-luminous display as set forth in claim 4,
   wherein the first wave plate is arranged such that a slow axis of the first wave plate is inclined with respect to an absorption axis of the polarizing film at an angle of 45±5 degrees or an angle of 135±5 degrees, and
   wherein the second wave plate is arranged such that a slow axis of the second wave plate is inclined with respect to the absorption axis of the polarizing film at an angle of 45±5 degrees or an angle of 135±5 degrees.

* * * * *